US012678665B2

(12) United States Patent
Hsu

(10) Patent No.: US 12,678,665 B2
(45) Date of Patent: Jul. 14, 2026

(54) FITNESS EQUIPMENT STRUCTURE WITH EXTERNAL-ROTOR MOTOR

(71) Applicant: Chih-Yung Hsu, Tainan City (TW)

(72) Inventor: Chih-Yung Hsu, Tainan City (TW)

( * ) Notice: Subject to any disclaimer, the term of this patent is extended or adjusted under 35 U.S.C. 154(b) by 126 days.

(21) Appl. No.: 18/650,765

(22) Filed: Apr. 30, 2024

(65) Prior Publication Data

US 2025/0135288 A1 May 1, 2025

(30) Foreign Application Priority Data

Oct. 25, 2023 (TW) ................................. 112211521

(51) Int. Cl.
*A63B 24/00* (2006.01)
*A63B 22/06* (2006.01)
*H02P 6/06* (2006.01)
*H02P 6/18* (2016.01)

(52) U.S. Cl.
CPC ...... *A63B 24/0087* (2013.01); *A63B 22/0605* (2013.01); *H02P 6/06* (2013.01); *H02P 6/18* (2013.01)

(58) Field of Classification Search
CPC ............ A63B 24/0087; A63B 22/0605; A63B 2220/805; A63B 21/0053; H02P 6/06; H02P 6/18
See application file for complete search history.

(56) References Cited

U.S. PATENT DOCUMENTS

| 10,307,631 | B2 * | 6/2019 | Jeremic | .............. A63B 22/0076 |
| 2013/0123074 | A1 * | 5/2013 | Jun | .................... A63B 22/0087 |
| | | | | 297/195.11 |
| 2021/0111646 | A1 * | 4/2021 | Rubin | .................... A63B 22/02 |
| 2022/0368260 | A1 * | 11/2022 | Chen | ..................... H02K 7/025 |

FOREIGN PATENT DOCUMENTS

| CN | 208770756 U | 4/2019 |
| TW | M341528 U | 10/2008 |

* cited by examiner

*Primary Examiner* — Andrew M Kobylarz
(74) *Attorney, Agent, or Firm* — Rosenberg, Klein & Lee

(57) ABSTRACT

A fitness equipment structure with an external-rotor motor includes: a force application unit fixed on a basic frame; a motor with an external rotor rotatably provided on the basic frame and surrounding an internal stator; an encoding disk that can rotate along with the external rotor; an encoding unit for reading rotation information provided by the encoding disk; and a control unit for receiving the rotation information and controlling an electromagnetic field of the internal stator in order for the external rotor to provide rotational resistance, wherein the control unit selectively changes the intensity of the electromagnetic field in order to change the rotational resistance.

10 Claims, 7 Drawing Sheets

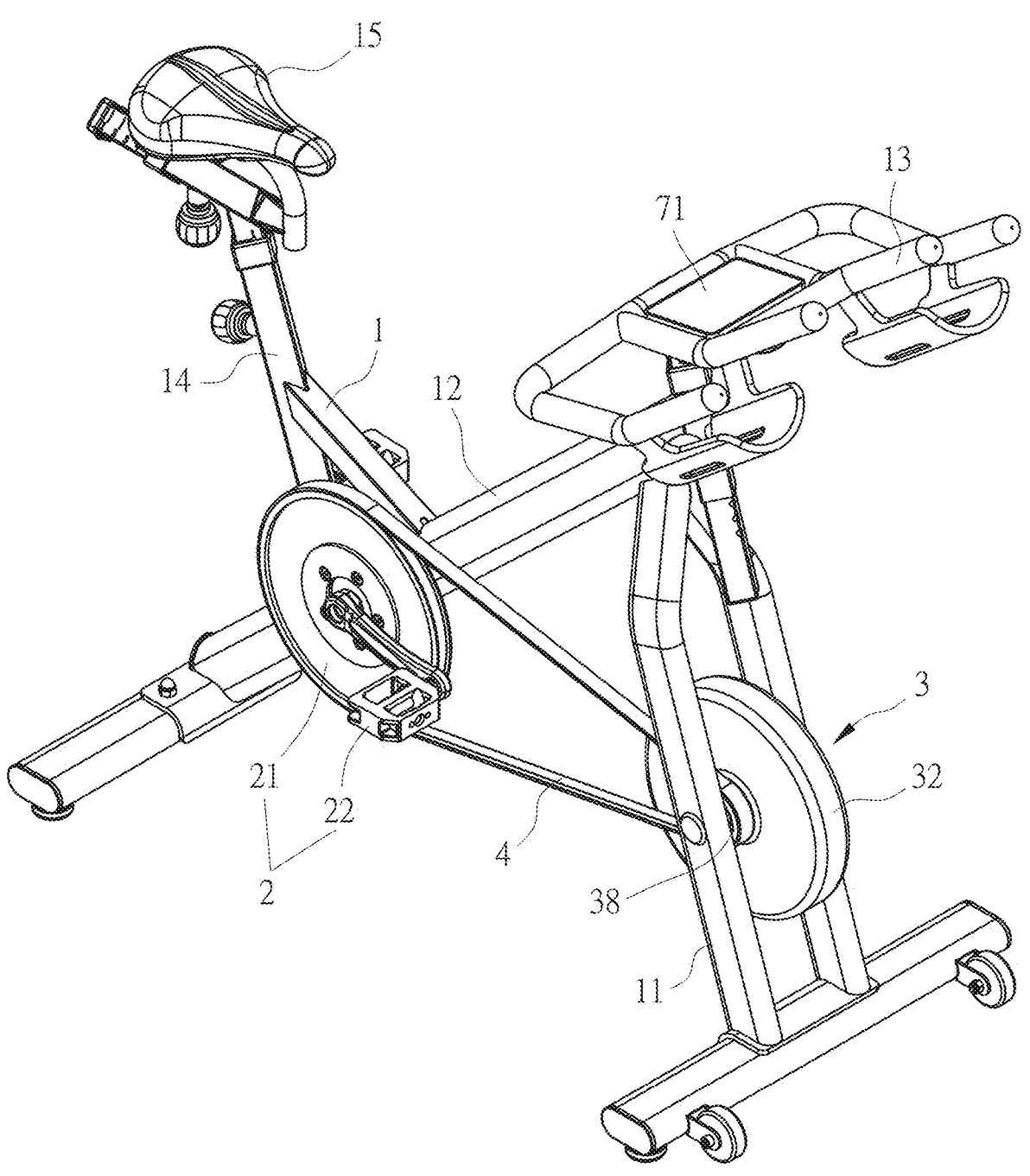
F I G . 1

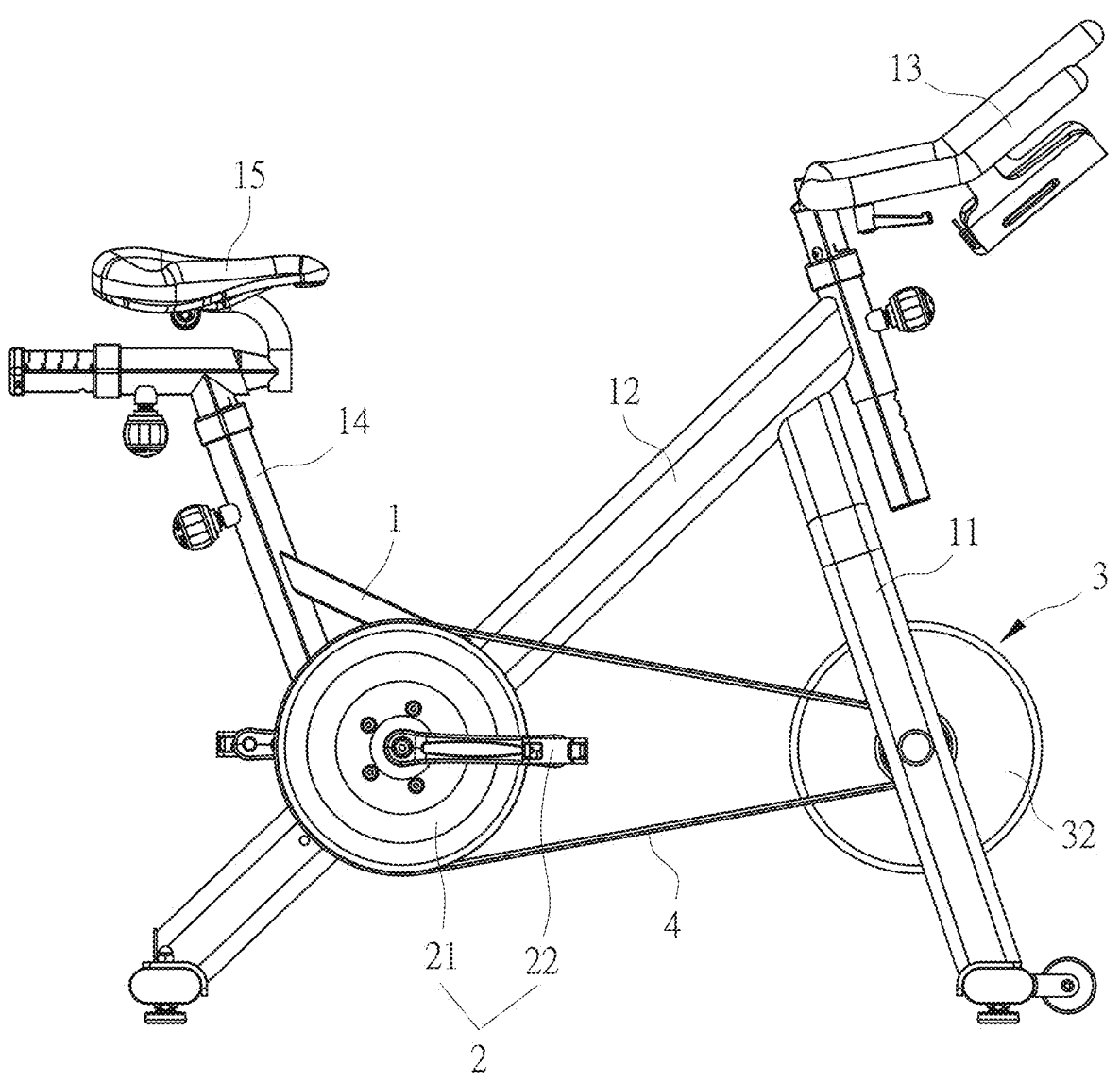
F I G . 2

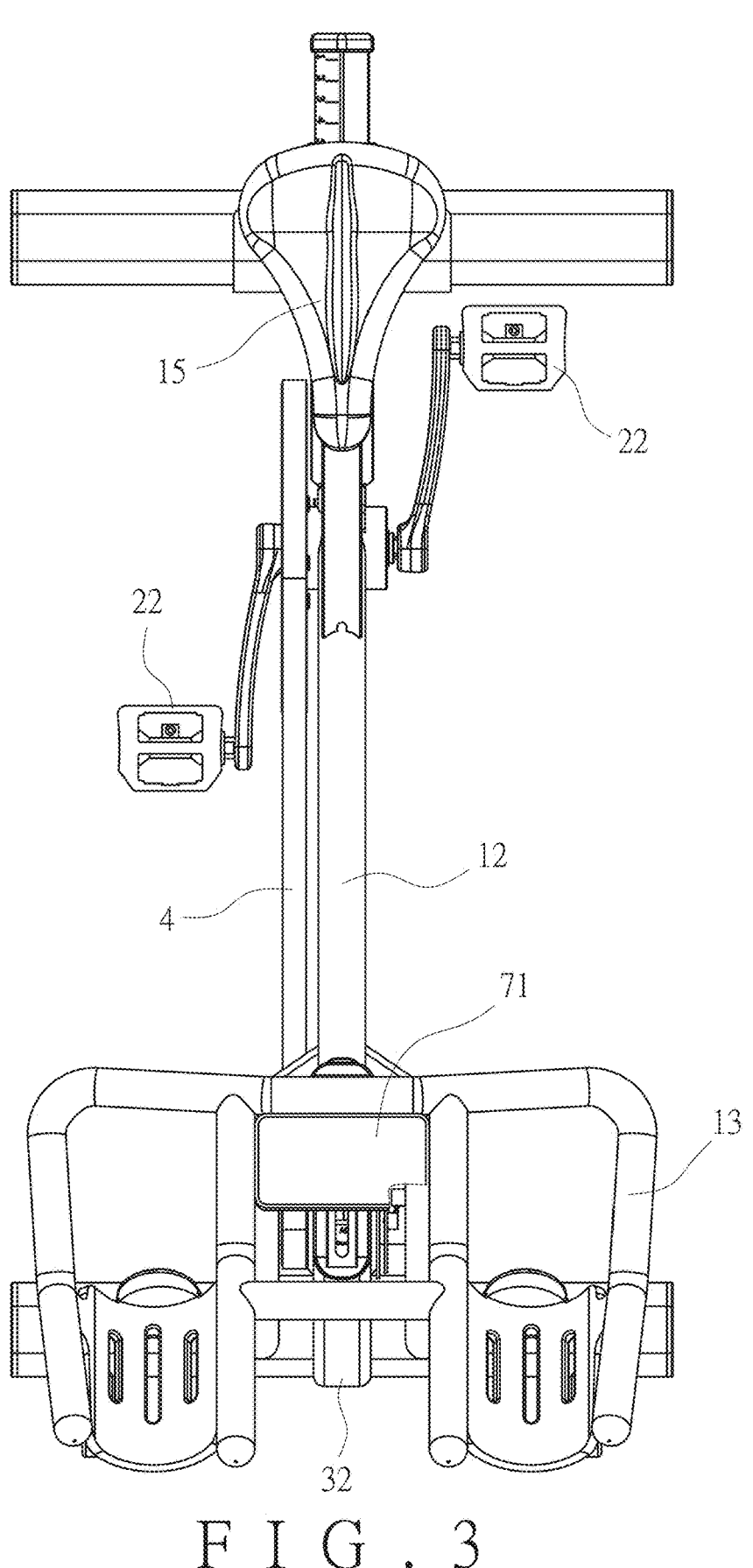
F I G . 3

F I G . 4

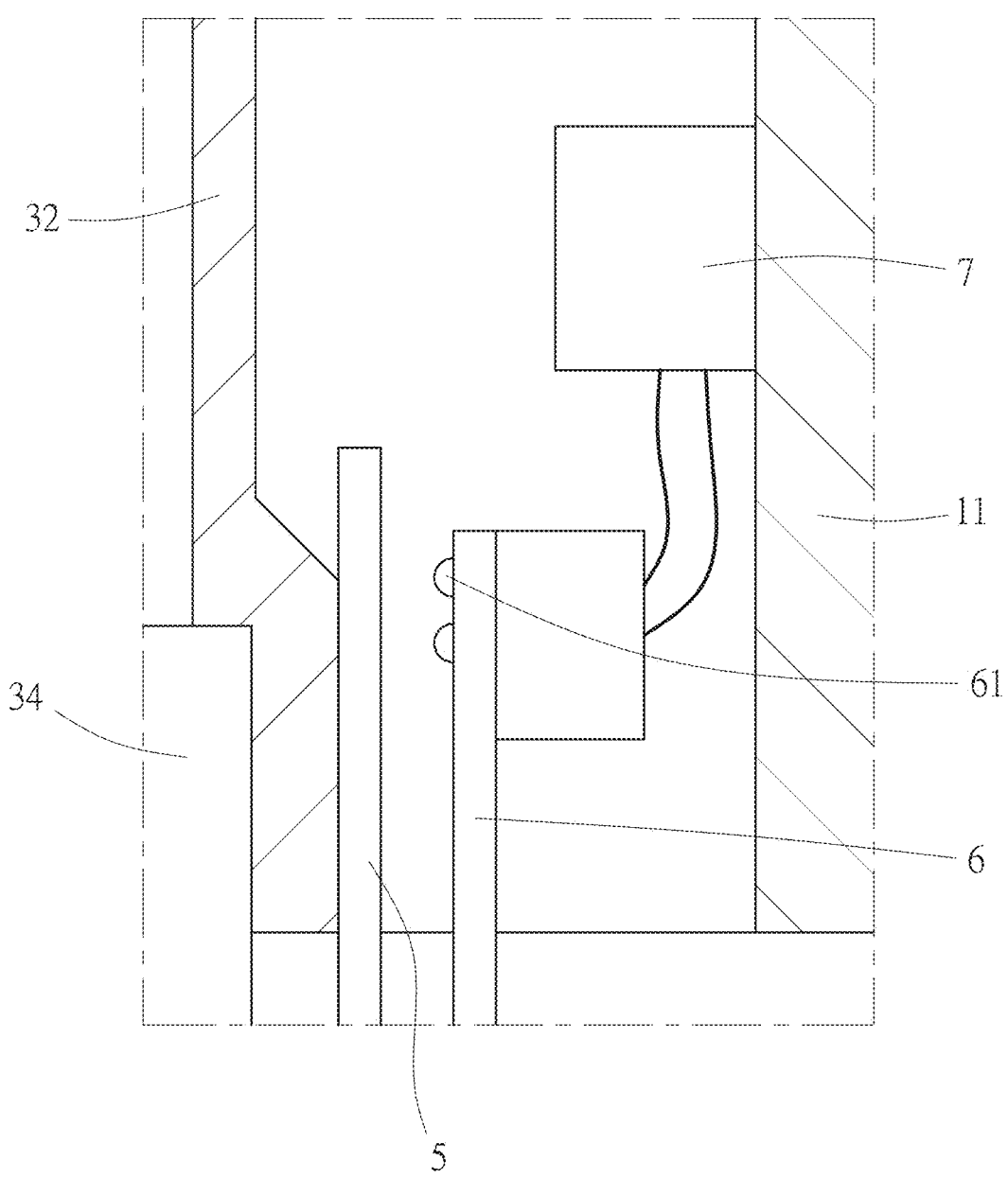
F I G . 5

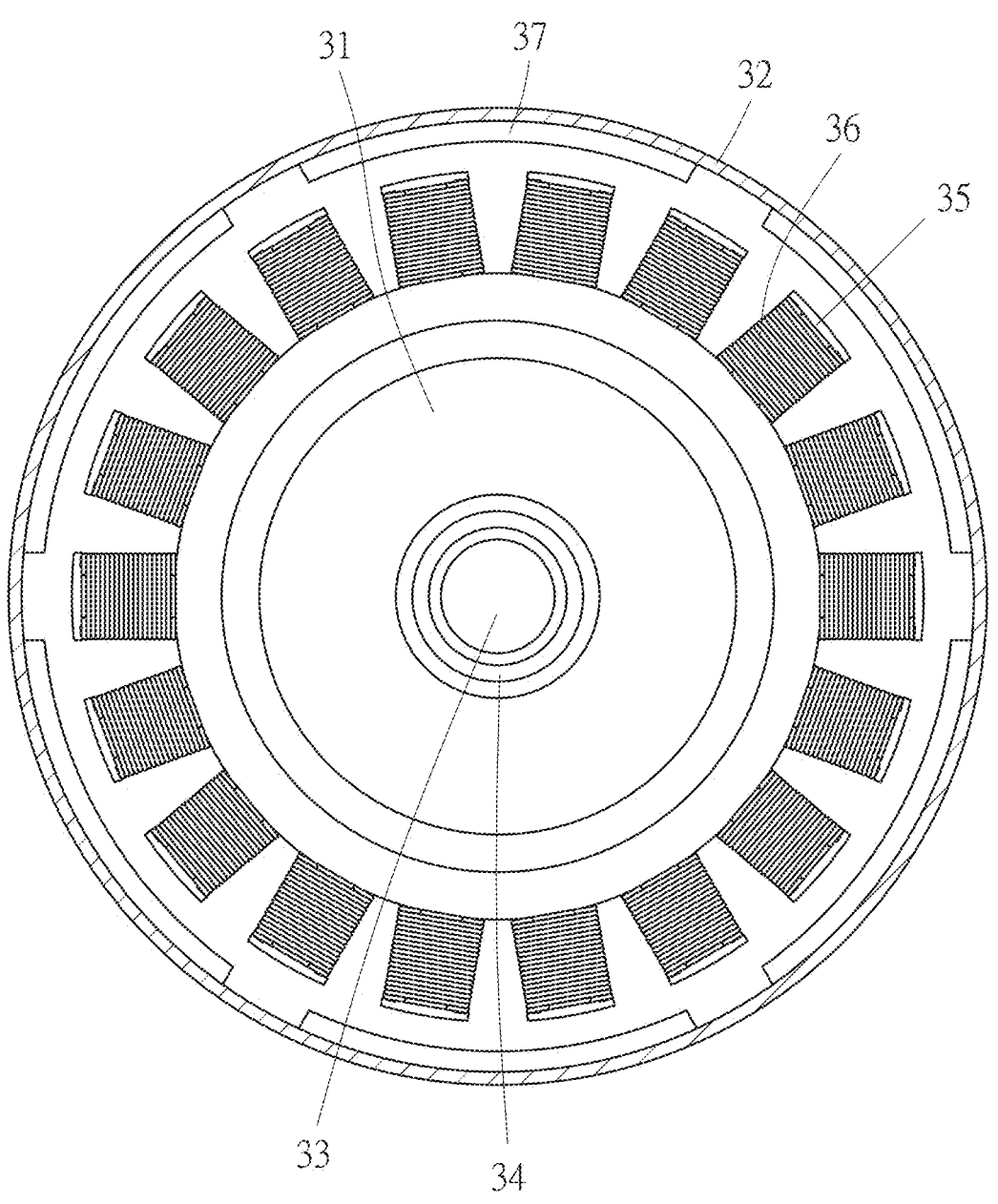
F I G . 6

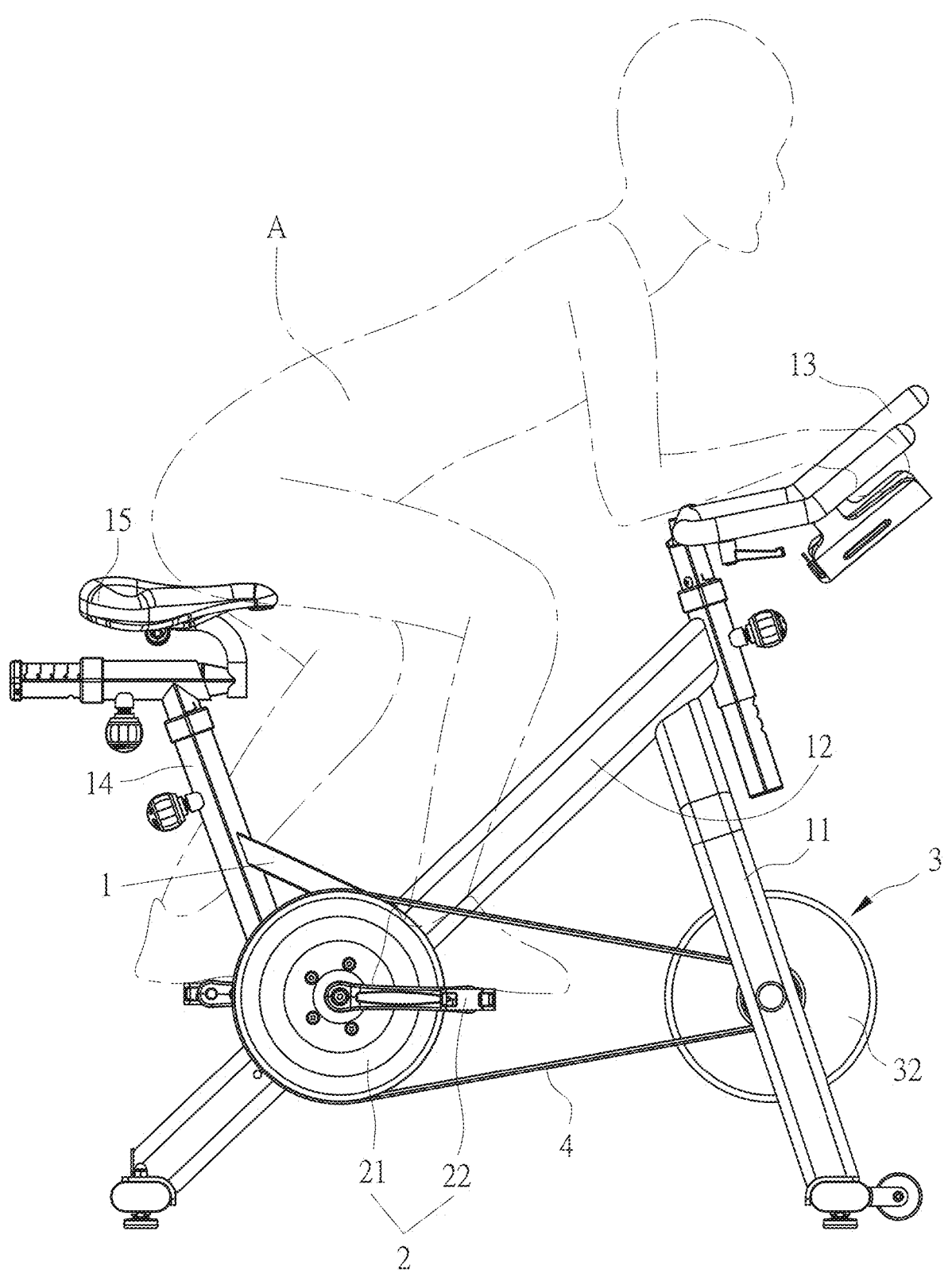
F I G . 7

FITNESS EQUIPMENT STRUCTURE WITH EXTERNAL-ROTOR MOTOR

BACKGROUND OF THE INVENTION

1. Technical Field

The present invention relates to a fitness equipment structure that has a variety of training modes to choose from and that includes a transmission member connected directly between a transmission wheel and an external rotor to enable the transmission of mechanical power and the reception of rotational resistance.

2. Description of Related Art

Fitness equipment such as a stationary bicycle (also known as a spin bike) or an exercise bicycle works mainly on a resistance generation device whose resistance value can be manually controlled and set, or more particularly can be adjusted according to a user's exercise requirements. However, once an adjustment is made, and exercise is carried out with the resulting resistance value, the resistance value cannot be further adjusted during the exercise. To adjust the resistance value again, it is required to stop the exercise and wait for the fitness equipment to be completely still, and this causes inconvenience of use.

As a solution, China Utility Model Patent No. CN208770756, "EXERCISE BICYCLE CONTROL SYSTEM CAPABLE OF AUTOMATIC RESISTANCE REGULATION," published on Apr. 23, 2019, discloses an exercise bicycle control system that includes a flywheel, a resistance device, a resistance regulation and control device, and a meter. The resistance device is mounted at a position adjacent to the flywheel and can be moved toward and away from the flywheel. The resistance regulation and control device is connected to the meter and the resistance device and is configured to control the position of the resistance device in relation to the flywheel so as to achieve the desired resistance level and produce the corresponding resistance level information to be displayed by the meter. The resistance regulation and control device includes a motor, a gear transmission mechanism, and a screw rod-and-sleeve device that are sequentially connected together, in addition to an encoder. The screw rod-and-sleeve device is connected to the resistance device, and the encoder is mounted on the motor in order to obtain the rotation speed of the motor. The exercise bicycle control system is connected to a communication terminal through Bluetooth or USB-based signal transmission so that a user can conveniently obtain in real time the current speed and power of the exercise bicycle, the distance travelled, and the calories consumed.

In the '756 patent, the motor has an internal-rotor motor structure, and resistance is transmitted by the gear transmission mechanism driving the screw rod-and-sleeve device; in other words, the resistance is not transmitted directly to the position where the user applies a force. As a result, the exercise bicycle control system not only has a relatively large number of components and a relatively large volume that takes up a relatively large space, but also has an inaccurate resistance value because the resistance may be reduced by the friction of the gear transmission mechanism during the transmission process. The technical features of the '756 patent, therefore, are markedly different from those of the present invention.

In addition, Taiwan Utility Model Patent No. M341528, "STATIONARY EXERCISE BICYCLE," published on Oct.

1, 2008, discloses a stationary exercise bicycle that uses a direct-current (DC) motor as the main source of driving power and that is provided with control circuits. When a user desires to do passive exercise, the DC motor can drive a pedal assembly automatically so that by applying the working principle of an electric motor, and after adjusting the rotation speed of the DC motor to the desired level through a control device, assisted exercise can be carried out. When the user desires to do exercise with a resistance load instead, the control device can be used to switch to a manual-input power generation mode so that by applying the working principle of an electric generator, and by adjusting the resistance to different values, the user can feel a change in resistance while pedaling. Moreover, the user can achieve an ergonomically preferred exercise position by adjusting the seat device in two directions, namely the vertical direction and the forward-rearward direction, according to the user's body height.

In the '528 patent, the DC motor also has an internal-rotor motor structure, and resistance is transmitted between the DC motor and the pedal assembly through a secondary transmission assembly composed of a large belt pulley, two flywheels, and a transmission belt; in other words, the resistance is not transmitted directly to the position where the user applies a force. Therefore, like the exercise bicycle control system in the '756 patent, the stationary exercise bicycle not only has a relatively large number of components and a relatively large volume that takes up a relatively large space, but also has an inaccurate resistance value because the resistance may be reduced by the friction of the gear transmission mechanism during the transmission process, thus leaving much to be desired in terms of use.

BRIEF SUMMARY OF THE INVENTION

In view of the foregoing drawbacks of the motor-based resistance structures of the existing fitness equipment, the present invention provides a fitness equipment structure that uses an external-rotor motor. The fitness equipment structure includes: a basic frame; a force application unit fixed on the basic frame; a motor that includes an internal stator and an external rotor, wherein the internal stator is fixed on the basic frame, and the external rotor is rotatably provided on the basic frame and surrounds the internal stator; a transmission member connecting the force application unit and the external rotor; an encoding disk fixed on the external rotor and rotatable along with the external rotor; an encoding unit fixed on the internal stator or the basic frame and configured to read rotation information provided by the encoding disk; and a control unit connected to the motor and the encoding unit and configured to receive the rotation information, wherein the control unit controls an electromagnetic field of the internal stator in order for the external rotor to provide rotational resistance, and the control unit changes the rotational resistance by selectively changing the intensity of the electromagnetic field according to a preset program and the rotation information.

The force application unit includes at least one rotatable force application member, and the force application member is connected to the external rotor through the transmission member.

The external rotor has a lateral side forming a side wheel, and the transmission member is a closed belt. One end of the belt is looped around the force application unit while the other end of the belt is directly looped around the periphery of the side wheel.

The control unit controls the electromagnetic field in order to bring the electromagnetic field into a fixed mode. More specifically, the control unit controls the electromagnetic field by maintaining the intensity of the electromagnetic field such that the rotational resistance has a fixed value.

The control unit controls the electromagnetic field in order to bring the electromagnetic field into a gradually changing mode. More specifically, the control unit controls the electromagnetic field by gradually increasing or gradually decreasing the intensity of the electromagnetic field such that the rotational resistance is gradually increased or gradually decreased.

The control unit controls the electromagnetic field in order to bring the electromagnetic field into a multi-stage mode that has a plurality of stages. More specifically, the control unit controls the electromagnetic field in such a way that the intensity of the electromagnetic field in any of the stages is different from that in an adjacent stage.

The control unit controls the electromagnetic field in order to bring the electromagnetic field into a safe mode. More specifically, the control unit controls the electromagnetic field by preventing the intensity of the electromagnetic field from exceeding an upper-limit value.

The control unit controls the electromagnetic field in order to bring the electromagnetic field into a random mode. More specifically, the control unit controls the electromagnetic field by changing the intensity of the electromagnetic field randomly.

The control unit controls the electromagnetic field in order to bring the electromagnetic field into a smart mode. More specifically, the control unit controls the electromagnetic field by changing the intensity of the electromagnetic field automatically according to the rotation information.

The internal stator includes a plurality of magnetic poles, and the magnetic poles are wound with a plurality of coils. The external rotor is circumferentially provided with a plurality of magnets corresponding to the magnetic poles.

The motor is a DC brushless motor.

The foregoing technical features have the following advantages:

1. That the encoding disk is rotated with respect to the encoding unit allows the control unit to obtain the rotation information, which includes the rotation speed, rotation position, and rotation angle of the external rotor, and to subsequently change the intensity of the electromagnetic field in a selective manner based on a pre-selected training mode, thereby changing the magnitude of the rotational resistance in accordance with the operator's training needs.

2. For each fitness training session, there are a variety of training modes to choose from, including the fixed mode, the gradually changing mode, the multi-stage mode, the safe mode, the random mode, and the smart mode. An operator may change the training mode according to their training needs.

3. The motor has an external-rotor motor structure, with the periphery of the internal stator circumferentially provided with a plurality of magnetic poles that are wound with coils to generate an electromagnetic field, and with the inner periphery of the external rotor circumferentially provided with a plurality of magnets that correspond to the magnetic poles so that the external rotor can provide rotational resistance when rotated with respect to the internal stator. Furthermore, when there are two force application members, an operator will be able to pedal with both feet (with the force application members serving as pedals) or hold the force application members in both hands in order to train force application in a rotary or reciprocating manner and, with the rotational resistance fed back to the two force application members through the transmission member, to train both legs or both arms.

4. Now that the transmission member is directly connected to the transmission wheel and the external rotor to transmit mechanical power and receive the rotational resistance, there is no need to use an additional gear set or speed-changing mechanism for the transmission of mechanical power and the reception of the rotational resistance. This helps reduce the number of components, and the overall volume, of the fitness equipment structure and hence the space occupied by the fitness equipment structure. Moreover, the resistance value of the rotational resistance will not be rendered inaccurate (or reduced, to be exact) by the friction of such a gear set or speed-changing mechanism while the rotational resistance is being transmitted. This allows the rotational resistance to be accurately applied during a training session.

BRIEF DESCRIPTION OF THE SEVERAL VIEWS OF THE DRAWINGS

FIG. 1 is a perspective view of an embodiment of the present invention.

FIG. 2 is a side view of the embodiment in FIG. 1.

FIG. 3 is a top view of the embodiment in FIG. 1.

FIG. 4 is a sectional view of the motor structure in the embodiment in FIG. 1.

FIG. 5 is an enlarged view of portion V in FIG. 4.

FIG. 6 schematically shows the coil-wound magnetic poles in the embodiment in FIG. 1.

FIG. 7 shows a state of use of the embodiment in FIG. 1.

DETAILED DESCRIPTION OF THE INVENTION

Directional terms such as left, right, front, rear, upper, and lower that are used to describe the following embodiment of the present invention refer to relative positions with respect to, and perceived by, an operator A (see FIG. 7) who is sitting on the seat 15 of the basic frame 1 in the invention and looks straight ahead. Such directional terms are used only to facilitate description of the embodiment but not to limit the spatial configuration of the invention. In addition, the fitness equipment referred to herein may be an exercise bicycle or a stationary bicycle.

Referring to FIG. 1, FIG. 2, and FIG. 3, one embodiment of the present invention include a basic frame 1, a force application unit 2, a motor 3, a transmission member 4, an encoding disk 5, an encoding unit 6, and a control unit 7.

The basic frame 1 includes a first supporting member 11 and a second supporting member 12 that are connected to each other and supported on the ground. The front end of the second supporting member 12 is connected with a gripping frame 13, and a middle section of the second supporting member 12 is connected with a supporting rod 14. The top end of the supporting rod 14 is provided with a seat 15.

The force application unit 2 is fixed on the basic frame 1. The force application unit 2 includes a transmission wheel 21 and at least one force application member 22 that can be rotated. The transmission wheel 21 is pivotally provided on the second supporting member 12 of the basic frame 1 and is configured to pivot with respect to the second supporting member 12. In this embodiment of the present invention, there are two force application members 22 arranged in a bilateral symmetric manner and connected to, and coaxial with, the transmission wheel 21 so that by applying a force to the two force application members 22, the transmission wheel 21 can be driven to rotate. The two force application members 22 may be rotary pedals to be operated with both feet, rotary levers to be held and operated with both hands, or reciprocating operation members to be held and operated with both hands, so as to enable force application in a rotary or reciprocating manner.

Figure 4:
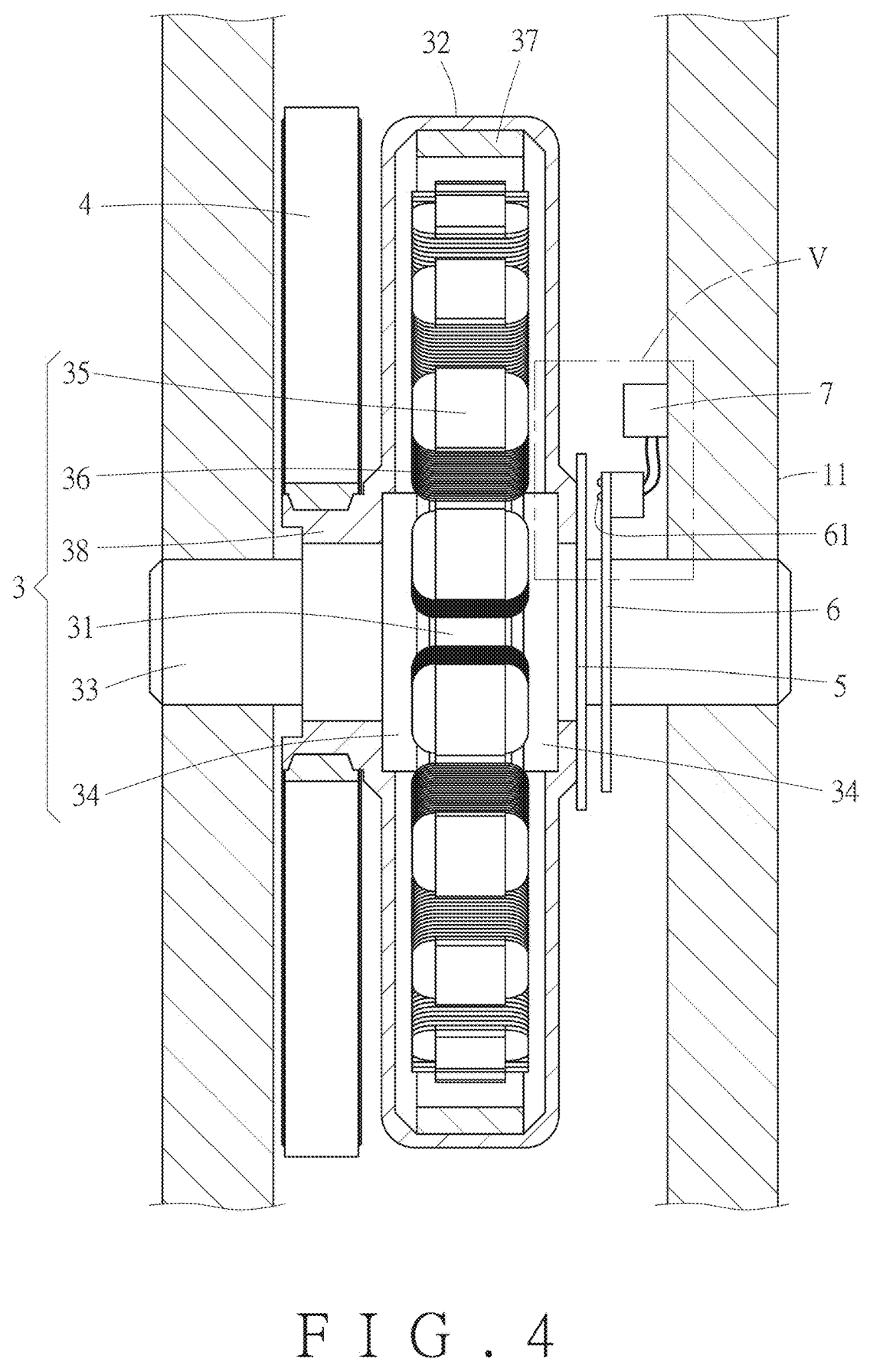

Referring to FIG. 4, FIG. 5, and FIG. 6, the motor 3 includes an internal stator 31 and an external rotor 32, and the motor 3 is a DC brushless motor. The internal stator 31 is fixed to the first supporting member 11 of the basic frame 1 through a shaft 33. The external rotor 32 has two lateral sides each mounted with a bearing 34. The two bearings 34 are fixed on the shaft 33 such that the external rotor 32 is provided on the first supporting member 11 of the basic frame 1 in a rotatable manner and can rotate around the internal stator 31. The periphery of the internal stator 31 is circumferentially provided with a plurality of magnetic poles 35, and the magnetic poles 35 are wound with coils 36 in order to generate an electromagnetic field. The inner periphery of the external rotor 32 is circumferentially provided with a plurality of magnets 37 corresponding to the magnetic poles 35. When the external rotor 32 is rotated with respect to the internal stator 31, the magnetic force of the magnets 37 and the electromagnetic field interact with each other, and the external rotor 32 generates rotational resistance as a result. One lateral side of the external rotor 32 forms a side wheel 38.

The transmission member 4 connects the transmission wheel 21 of the force application unit 2 and the external rotor 32. The force application members 22 are connected to the external rotor 32 through the transmission member 4. The transmission member 4 is a closed belt, and the belt has one end looped around the periphery of the transmission wheel 21 of the force application unit 2 and the other end directly looped around the periphery of the side wheel 38.

Referring to FIG. 5, the encoding disk 5 is fixed on the other lateral side of the external rotor 32 (i.e., the lateral side that does not form the side wheel 38) and can rotate along with the external rotor 32. The encoding disk 5 is configured to provide rotation information that includes the rotation speed, rotation position, and rotation angle of the external rotor 32.

The encoding unit 6 is fixed on the internal stator 31 or the basic frame 1 and is configured to read the rotation information provided by the encoding disk 5. The encoding unit 6 is an optical encoder, or more particularly a circuit board made according to the principles of optics and photoelectricity. The encoding unit 6 is provided with at least one reading head 61 that corresponds in position to the encoding disk 5 in order to read the rotation information, which includes the rotation speed, rotation position, and rotation angle of the external rotor 32.

The control unit 7 is fixed on the basic frame 1. The control unit 7 is connected to a control panel 71 through signal transmission, and the control panel 71 is provided at the gripping frame 13. The control unit 7 is also connected to the motor 3 and the encoding unit 6 through signal transmission in order to receive the rotation information. The control unit 7 is configured to control the electromagnetic field generated by the internal stator 31 in order for the external rotor 32 to provide the rotational resistance. The control unit 7 changes the rotational resistance by selectively changing the intensity of the electromagnetic field according to a preset program and the rotation information. More specifically, the control unit 7 selectively controls the electromagnetic field in order to bring the electromagnetic field into a fixed mode, a gradually changing mode, a multi-stage mode, a safe mode, a random mode, or a smart mode, the objective being to meet different operators' training needs.

To use, referring to FIG. 7 in conjunction with FIG. 1 and FIG. 4, the operator A sits on the seat 15 of the basic frame 1, holds the gripping frame 13 with both hands, and puts each foot on the corresponding one of the two force application members 22. A training mode is then selected in advance according to the operator A's physical conditions by inputting into the control panel 71 of the control unit 7, or more particularly by choosing how to control the electromagnetic field, i.e., whether to bring the electromagnetic field into the fixed mode, the gradually changing mode, the multi-stage mode, the safe mode, the random mode, or the smart mode. After that, the operator A starts to pedal, i.e., to apply a force to the two force application members 22 with two feet in an alternate manner, so that the transmission wheel 21 is driven to rotate by the two force application members 22. The external rotor 32, in turn, is driven to rotate by the transmission wheel 21 through the transmission member 4. The external rotor 32 provides the rotational resistance when rotated with respect to the internal stator 31, and the rotational resistance is fed back to the two force application members 22 through the transmission member 4 in order to train the operator A's legs. In addition, the control unit 7 reads the rotation information, which includes the rotation speed, rotation position, and rotation angle of the external rotor 32, with the reading head 61 as the encoding disk 5 is rotated with respect to the encoding unit 6.

When the external rotor 32 is rotated with respect to the internal stator 31, referring to FIG. 4 and FIG. 5, the reading head 61 of the encoding unit 6 reads the rotation information provided by the encoding disk 5 (which information includes the rotation speed, rotation position, and rotation angle of the external rotor 32). Then, based on the training mode pre-selected by the operator A, referring to FIG. 7 in conjunction with FIG. 1 and FIG. 4, the control unit 7 selectively changes the intensity of the electromagnetic field and hence the magnitude of the rotational resistance in order for the rotational resistance to meet the operator A's training needs. During the training process, the operator A may change the current training mode to another training mode by inputting into the control panel 71 of the control unit 7 again, or more particularly by selecting the fixed mode, the gradually changing mode, the multi-stage mode, the safe mode, the random mode, or the smart mode. For example, when the fixed mode is selected, the control unit 7 will control the electromagnetic field by maintaining the intensity of the electromagnetic field. This mode can be used to simulate the fixed resistance of an exercise bicycle, and the fixed value of the rotational resistance can be adjusted among multiple levels so that different fixed values can be selected to meet the operator A's different training needs.

If the operator A selects the gradually changing mode, the control unit 7 will control the electromagnetic field by gradually increasing or gradually decreasing the intensity of the electromagnetic field such that the rotational resistance is gradually increased or gradually decreased. This mode can be used to simulate the change of inertia of a stationary bicycle changing from the static state to a moving state or from a moving state to the static state.

If the operator A selects the multi-stage mode, which has multiple stages, the control unit 7 will control the electromagnetic field in such a way that the intensity of the electromagnetic field in any of the stages is different from that in an adjacent stage, and that in consequence the rotational resistance in any of the stages is different from that in an adjacent stage. This mode can be used to simulate the different magnitudes of rotational resistance experienced when riding a bicycle uphill, on level ground, and then downhill. In other words, this mode can produce a training effect that corresponds to a multi-stage riding experience.

If the operator A selects the safe mode, the control unit 7 will control the electromagnetic field by keeping the intensity of the electromagnetic field from going beyond an upper-limit value. This mode can be used to limit the magnitude of the rotational resistance according to the upper limit of the operator A's pedaling capabilities, lest the operator A have sports injury resulting from physical overload.

If the operator A selects the random mode, the control unit 7 will control the electromagnetic field by changing the intensity of the electromagnetic field randomly. This mode can be used to simulate a bicycle ride on a road of constantly changing slopes that give rise to different magnitudes of rotational resistance.

If the operator A selects the smart mode, the control unit 7 will control the electromagnetic field by changing the intensity of the electromagnetic field automatically according to the rotation information. As the rotation information includes the rotation speed, rotation position, and rotation angle of the external rotor 32, a beginner may use this mode to simulate a riding experience in which: when riding just begins, i.e., when the operator A is full of energy, the rotational resistance is adjusted to a relatively high magnitude; when the operator A's stamina is reduced in a middle stage of the ride, the rotational resistance is adjusted to a relatively low magnitude; and when the operator A's stamina is about to be depleted in the last stage of the ride, the rotational resistance is adjusted to the lowest magnitude. In this mode, the magnitude of the rotational resistance can be smartly changed according to variation of the operator A's stamina to prevent the operator A from having sports injury caused by physical overload.

As shown in FIG. 4 and FIG. 5, the motor 3 in the present invention has the external rotor 32, and the transmission member 4 is directly connected to the transmission wheel 21 and the external rotor 32 to transmit physical power and receive the rotational resistance. It is therefore unnecessary to use an additional gear set or speed-changing mechanism for transmitting physical power and receiving the rotational resistance. In consequence, the number of components of the fitness equipment structure of the invention is reduced in comparison with that of the prior art, and so are the overall volume of, and the space occupied by, the fitness equipment structure. Moreover, the rotational resistance will not be rendered inaccurate, i.e., reduced, by the friction of such a gear set or speed-changing mechanism during the transmission process and therefore can be accurately applied during a training session.

The description of the foregoing embodiment should be able to shed sufficient light on the operation, use, and intended effects of the present invention. The embodiment, however, is only a preferred one of the invention and is not intended to be restrictive of the scope of the invention. Any simple equivalent change or modification that is based on the disclosure of this specification and the appended claims shall fall within the scope of the invention.

What is claimed is:

1. A fitness equipment structure with an external-rotor motor, comprising:
   a basic frame;
   a force application unit fixed on the basic frame;
   the external-rotor motor comprising an internal stator and an external rotor, wherein the internal stator is fixed on the basic frame, and the external rotor is rotatably provided on the basic frame and surrounds the internal stator;
   a transmission member connecting the force application unit and the external rotor;
   an encoding disk fixed on the external rotor and rotatable along with the external rotor;
   an encoding unit fixed on the internal stator or the basic frame, wherein the encoding unit reads rotation information provided by the encoding disk; and
   a control unit connected to the motor and the encoding unit, wherein the control unit receives the rotation information, the control unit controls an electromagnetic field of the internal stator in order for the external rotor to provide rotational resistance, and the control unit changes the rotational resistance by selectively changing an intensity of the electromagnetic field according to a preset program and the rotation information, wherein in order to bring the electromagnetic field into a safe mode, the control unit controls the electromagnetic field by keeping the intensity of the electromagnetic field from exceeding an upper-limit value.

2. The fitness equipment structure with the external-rotor motor as claimed in claim 1, wherein the force application unit comprises at least one rotatable force application member, and the force application member is connected to the external rotor through the transmission member.

3. The fitness equipment structure with the external-rotor motor as claimed in claim 1, wherein the external rotor has a lateral side forming a side wheel, the transmission member is a closed belt, and the belt has one end looped around the force application unit and an opposite end directly looped around a periphery of the side wheel.

4. The fitness equipment structure with the external-rotor motor as claimed in claim 1, wherein in order to bring the electromagnetic field into a fixed mode, the control unit controls the electromagnetic field by maintaining the intensity of the electromagnetic field such that the rotational resistance has a fixed value.

5. The fitness equipment structure with the external-rotor motor as claimed in claim 1, wherein in order to bring the electromagnetic field into a gradually changing mode, the control unit controls the electromagnetic field by gradually increasing or gradually decreasing the intensity of the electromagnetic field such that the rotational resistance is gradually increased or gradually decreased.

6. The fitness equipment structure with the external-rotor motor as claimed in claim 1, wherein in order to bring the electromagnetic field into a multi-stage mode having a plurality of stages, the control unit controls the electromagnetic field in such a way that the intensity of the electromagnetic field in any of the stages is different from the intensity in an adjacent one of the stages.

7. The fitness equipment structure with the external-rotor motor as claimed in claim 1, wherein the internal stator comprises a plurality of magnetic poles, the magnetic poles are wound with a plurality of coils, and the external rotor is circumferentially provided with a plurality of magnets corresponding to the magnetic poles.

8. The fitness equipment structure with the external-rotor motor as claimed in claim 1, wherein the motor is a direct-current (DC) brushless motor.

9. A fitness equipment structure with an external-rotor motor, comprising:

a basic frame;

a force application unit fixed on the basic frame;

the external-rotor motor comprising an internal stator and an external rotor, wherein the internal stator is fixed on the basic frame, and the external rotor is rotatably provided on the basic frame and surrounds the internal stator;

a transmission member connecting the force application unit and the external rotor;

an encoding disk fixed on the external rotor and rotatable along with the external rotor;

an encoding unit fixed on the internal stator or the basic frame, wherein the encoding unit reads rotation information provided by the encoding disk; and a control unit connected to the motor and the encoding unit, wherein the control unit receives the rotation information, the control unit controls an electromagnetic field of the internal stator in order for the external rotor to provide rotational resistance, and the control unit changes the rotational resistance by selectively changing an intensity of the electromagnetic field according to a preset program and the rotation information, wherein in order to bring the electromagnetic field into a random mode, the control unit controls the electromagnetic field by changing the intensity of the electromagnetic field randomly.

10. A fitness equipment structure with an external-rotor motor, comprising:

a basic frame;

a force application unit fixed on the basic frame;

the external-rotor motor comprising an internal stator and an external rotor, wherein the internal stator is fixed on the basic frame, and the external rotor is rotatably provided on the basic frame and surrounds the internal stator;

a transmission member connecting the force application unit and the external rotor;

an encoding disk fixed on the external rotor and rotatable along with the external rotor;

an encoding unit fixed on the internal stator or the basic frame, wherein the encoding unit reads rotation information provided by the encoding disk; and a control unit connected to the motor and the encoding unit, wherein the control unit receives the rotation information, the control unit controls an electromagnetic field of the internal stator in order for the external rotor to provide rotational resistance, and the control unit changes the rotational resistance by selectively changing an intensity of the electromagnetic field according to a preset program and the rotation information, wherein in order to bring the electromagnetic field into a smart mode, the control unit controls the electromagnetic field by changing the intensity of the electromagnetic field automatically according to the rotation information.

\* \* \* \* \*